UNITED STATES PATENT OFFICE.

LUDWIG KNORR, OF JENA, GERMANY, ASSIGNOR TO THE FARBWERKE, VORMALS MEISTER, LUCIUS & BRÜNING, OF HÖCHST-ON-THE-MAIN, GERMANY.

MORPHOLIN AND PROCESS OF MAKING SAME.

SPECIFICATION forming part of Letters Patent No. 615,488, dated December 6, 1898.

Application filed December 29, 1897. Serial No. 664,432. (No specimens.)

*To all whom it may concern:*

Be it known that I, LUDWIG KNORR, Ph. D., professor of chemistry, a citizen of the Empire of Germany, residing at Jena, Germany, have invented certain new and useful Improvements in the Manufacture of Morpholins, (for which I have obtained Letters Patent in Germany, No. 95,854, dated March 30, 1897,) of which the following is a specification.

I have found that the derivatives of dioxyethylamin which contain the atom complex $$N\begin{cases}C-C-OH\\C-C-OH\end{cases}$$

may be transformed by the action of acid condensation agents into morpholin or morpholin derivatives by heating the former with dioxyethylamin derivatives to 100° to 200° centigrade. Condensation agents may be employed—for instance, concentrated hydrochloric acid, phosphoric acid, phosphorous pentoxid, and acetic-acid anhydride—the best results being obtained with moderately-concentrated sulfuric acid of about sixty to seventy per cent.

The effect of the condensation agents is a splitting off of water. The transformation of dioxyethylamin into morpholin is illustrated, for instance, by the following equation:

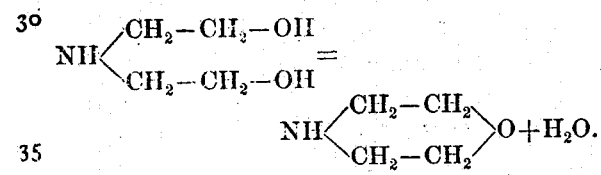

By employing hydrochloric acid as a condensation agent a chlorhydrin of dioxyethylamin is produced as an intermediate product, already mentioned by me in the *Berliner Berichte*, 1889, p. 2084. The process, however, is essentially the same in using other condensation agents.

I illustrate my process by the following example: A solution of dioxyethylamin is heated for several hours to about 160° centigrade in five to ten times the quantity of sulfuric acid of seventy per cent. The product of reaction is oversaturated with alkali and distilled with steam. The morpholin distils over rapidly and completely with the steam. By the evaporation of the distillate neutralized with hydrochloric acid the morpholin hydrochlorate is obtained as a white crystalline mass. From this salt the morpholin may be set free with alkalies. It boils at 128° centigrade. It possesses a characteristic odor similar to that of piperidin, which it resembles completely in its chemical behavior, yielding a nitrosamin of the boiling-point of 224.5° centigrade, urethan of 220° to 221° centigrade, benzoyl derivative of the melting-point 74° to 75° centigrade.

Morpholin is easily soluble in water, alcohol, ether, and benzene. In the same way may be obtained from the derivatives of dioxyethylamin—for instance, methyldioxyethylamin, ethyldioxyethylamin, phenyldioxyethylamin, oxyethyldioxyethylamin, orthoöxyethylamidophenol, $$\left(C_6H_4\begin{cases}OH\\NH-CH_2\end{cases}\begin{matrix}CH_2OH\\|\end{matrix}\right)$$

or orthoöxyethylmethylamidophenol, $$\left(C_6H_4\begin{cases}OH\\NCH_3-CH_2\end{cases}\begin{matrix}CH_2OH\\|\end{matrix}\right)$$

—the corresponding morpholin derivatives—viz., one methylmorpholin, boiling-point 115° to 117° centigrade; one ethylmorpholin, boiling-point 138° to 139° centigrade; one phenylmorpholin, boiling-point 270° centigrade; one oxyethylmorpholin, boiling-point 240° centigrade; phenmorpholin, boiling-point 268° centigrade, and methylphenmorpholin, boiling-point 261° centigrade.

The morpholins are used as medicaments or as primary products for the manufacture of the same, acting in doses of 0.1 to one gram as a narcotic.

Having thus described my invention, I claim as new and desire to secure by Letters Patent—

1. A process for the manufacture of morpholins, which consists in heating to from 100° to 200° centigrade the dioxy compounds with the atom complex $N\begin{cases}C-C-OH\\C-C-OH\end{cases}$ with acid condensation agents, then making the solution alkaline and distilling with steam, substantially as set forth.

2. As a new product, the morpholin of the formula

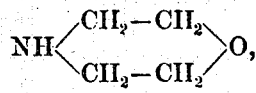

the same being a liquid boiling at 128° centigrade, easily soluble in water, alcohol, ether and benzene, soluble in acids, and having an odor similar to piperidin, substantially as set forth.

In testimony that I claim the foregoing as my invention I have signed my name in presence of two subscribing witnesses.

LUDWIG KNORR.

Witnesses:
  PAUL TEICHMANN,
  ELISABETH KNORR.